Patented June 19, 1945

2,378,530

UNITED STATES PATENT OFFICE 2,378,530

CATALYTIC HYDROCARBON CONVERSION PROCESS

James C. Bailie and Melvin J. See, Chicago, Ill., assignors to Standard Oil Company, Chicago, Ill., a corporation of Indiana No Drawing. Application February 18, 1942, Serial No. 431,334

14 Claims. (Cl. 196—52)

This invention relates to the conversion of hydrocarbons by the action of catalysts. More particularly, it relates to a process and a catalyst for the conversion of heavy oils into lighter hydrocarbons by the action of catalysts of the magnesia-silica type. One object of the invention is to provide a catalyst for cracking heavy oils into gasoline with the formation of higher yields of gasoline and lesser amounts of carbon than catalysts heretofore employed. Another object of the invention is to modify the character of catalysts comprising silica and calcined magnesia in a way to render them more stable to high temperatures while retaining or increasing their desirable properties with respect to activity and product distribution. This application is a continuation-in-part of U. S. Patent No. 2,343,731 filed on February 5, 1940.

In the conversion of hydrocarbon oils, for example the cracking of gas oil into high knock rating gasoline by the action of catalysts at conversion temperatures, it has been found that catalysts comprised of a mixture of active silica and activated magnesia have the distinct advantage of producing a larger proportion of gasoline in relation to the production of fixed gases and carbon. This characteristic, known as "a favorable product distribution," increases the realization from products and also makes it possible to operate a catalytic conversion process with these catalysts for a greater proportion of the time "in process" and a lesser proportion of time "in regeneration" while deposited carbon is burned from the catalyst. The silica-magnesia catalysts, however, suffer from the disadvantage of relatively low heat stability which results in abnormal catalyst degeneration and shortened catalyst life. The composition of the catalysts may vary considerably, but an activated magnesia content of about 15 to 30% usually gives the most active catalysts. However, compositions containing about 5 to 50% MgO may be employed.

We now have discovered that the heat stability of the silica-magnesia catalysts may be substantially increased by incorporating therein small amounts of the oxides of the metals of the left column of group VI of the periodic table. Uranium oxide is particularly effective, the amount required being only 2% based on the weight of the catalyst. In general, the amount of the stabilizing oxide required is about 0.1 to 5 or 10%. The silica-magnesia catalyst may be prepared by the following method: Silica gel or silica hydrogel is intimately mixed with previously activated magnesia which may be a calcined magnesite. The mixture is preferably prepared as a wet mass to which is added an oxide, hydroxide or salt of the desired group VI metal. Uranium nitrate, ammonium molybdate, ammonium tungstate, etc. may be used. The mixture is then dried and ignited after which it is crushed to the desired size and, if desired, pelleted. The promoter metal may be added to the magnesia or the silica or both before mixing, although it is preferred to add the promoter to the activated magnesia, then mix with silica.

The following examples will illustrate the results obtainable with silica-magnesia catalysts stabilized with uranium in one case and tungsten in another case. A catalyst was prepared by impregnating 200 grams of active magnesia with 28.6 grams of uranium nitrate, $UO_2(NO_3)_2 \cdot 6H_2O$. The magnesia, known as "plastic" magnesia, was obtained from the calcining of magnesite at high temperature, between about 1000 and 2000° F. The mixture was allowed to dry and then heated to 1000° F. It was then ground in a ball mill with 4760 grams of silica hydrogel to form a smooth slurry which was filtered and dried. The lumps were heated to 1100° F., crushed and screened to 4–16 mesh. Analysis of the catalyst showed a composition corresponding to approximately 76% $SiO_2$, 22% $MgO$ and 2% $UO_3$.

This catalyst was employed in the conversion of Mid-Continent gas oil of 35° A. P. I. gravity, employing a space velocity of 1 volume of oil per hour per volume of catalyst for two 2-hour periods, regenerating the catalyst in the interim by combustion with air. The following average results were obtained:

Gasoline (10 lb. R. V. P.) _____ per cent by volume _____ 41.4
Excess $C_4$ _____ per cent\_\_ 5.4
Dry gas _____ per cent by weight\_\_ 10.1
Carbon _____ per cent\_\_ 2.6
Gasoline knock rating _____ A. S. T. M.\_\_ 78.6

The catalyst was then heated to successively higher temperatures for 24-hour periods and between each heat treatment the cracking operation was repeated for 1-hour periods to determine the effect of the heating on the activity of the catalyst. The cracking activity was determined from the amount of unconverted gas oil recovered, the total conversion being the difference between the gas oil charged and the gas oil recovered. The results are given in the following table:

| Catalyst | Total conversion | | | |
|---|---|---|---|---|
| | Initial | After heating 24 hours | | |
| | | 1,200° | 1,300° | 1,400° |
| Silica-magnesia (22 to 25% MgO) | 65 | 66 | 63 | 21 |
| Silica-magnesia+2% urania | 58 | 56 | 52 | 45 |

It will be noted that the activity of the urania stabilized silica-magnesia catalyst heated at 1400°

F. for 24 hours was more than twice as high as the activity of the unstabilized silica-magnesia catalyst.

A similar series of heat stability tests was conducted with a silica-magnesia catalyst in which the uranium salt was added to the silica in the same manner. In this case the catalyst was stable at 1300° F. but not at 1400° F., a result which may indicate that the stabilizing effect of the urania may be exerted on the magnesia rather than on the silica.

The following is an example of a silica-magnesia catalyst stabilized with a small amount of tungsten oxide. The final composition of the catalyst was approximately 75% $SiO_2$, 24% MgO and 1% $WO_3$. It was made by treating calcined magnesite with a solution of ammonium tungstate containing excess ammonia, then drying and igniting the magnesia at 1000° F. The resulting impregnated magnesia was then intimately ground with silica hydrogel which had been prepared by coagulation of sodium silicate with acid followed by washing to remove the salts. The silica-magnesia mixture was then dried and ignited to form hard, granular particles.

The following results were obtained in the conversion of gas oil of 35.5° A. P. I., the total conversion being expressed as previously by the amount of gas oil destroyed. The cracking conditions were 925° F. for 1 hour and a space velocity of 1.

| Catalyst | Total conversion | | | |
| --- | --- | --- | --- | --- |
| | Initial | After heating for 24 hours | | |
| | | 1,200° | 1,300° | 1,400° |
| Silica-magnesia (76% $SiO_2$, 24% MgO) | 65 | 66 | 63 | 21 |
| Silica-magnesia-tungstia (75% $SiO_2$, 24% MgO, 1% $WO_3$) | 57 | 64 | 46 | 45 |

It will be observed from the above data that the initial activity of the silica-magnesia catalyst was somewhat reduced by the $WO_3$ and that the thermal stability was considerably increased as shown by heating at 1400° F. It will also be observed that the activity of the tungsten stabilized catalyst was about the same as that of the catalyst containing no tungsten when heated at 1200° F.

In the preparation of our stabilized magnesia catalyst it is essential that the magnesia be activated by ignition before mixing with the silica component. Ignition at a temperature of 1000 to 1500° F. is suitable, although higher temperatures may be used. In the case of magesium carbonate, for example magnesite, the ignition serves to drive off carbon dioxide and produce magnesium oxide in the desired form. In the case of magnesium hydroxide or the mineral brucite, heating serves to drive off combined water and produce the oxide. This reaction is apparently incomplete below a dull red heat. The magnesia also appears to undergo a transformation to a different allotropic form as indicated by the increase in density on heating, for example, from about 3 or 3.2 up to 3.5 to 3.6. Magnesia may also be prepared in active form by ignition of certain magnesium salts, such as magnesium nitrate.

It has been found that magnesia-promoted silica catalysts are ineffective where the magnesia has not been ignited before mixing with the silica. In one example active silica was treated with magnesium sulfate and then ignited. The resulting catalyst gave a conversion of only 19.5%. In another example, magnesia was precipitated in the presence of silica gel giving a so-called plural gel. However, this catalyst gave a conversion of only 24.6% in comparison with a conversion of between about 40 and 50% for the catalyst in which calcined magnesia was employed. Magnesium silicate ($MgSiO_3$) gave a conversion of only 12.7%. The explanation of this phenomenon is not understood but the low activity of the silicate indicates that the calcining of magnesia may prevent or retard silicate formation.

In general, we prefer to employ our catalyst for the conversion of heavy hydrocarbon oils boiling above the gasoline boiling range. The vapors of the oils are contacted with the catalyst at a temperature of about 800 to 1100° F. with a space velocity of about 0.1 to 10, although higher space velocities of 20 or 30 may be employed in some cases, particularly where the catalyst is employed in the form of a powder suspended in the oil vapors. The preferred space velocity, however, is about 0.25 to 5 volumes of oil per hour per volume of catalyst. Atmospheric pressure or near atmospheric pressure is preferred for the operation although pressures of 50 or 75 pounds to 200 pounds per square inch may be employed if desired.

Regeneration of the catalyst is accomplished by contacting with an oxidizing gas under controlled conditions to avoid excessive heating which will permanently impair catalyst activity. The stabilized catalyst may be regenerated at higher temperatures than the unstabilized catalyst and when regenerated at the same temperature a longer catalyst life is obtained before it is necessary to discard the catalyst and replace it. Regeneration temperatures of about 1000 to 1200° F. are satisfactory. In the case of fixed bed operation the regeneration temperature may be controlled by recycling a substantial amount of the cooled regeneration gases by injecting air into the gases to effect the desired carbon removal. In the case of powdered catalysts, regeneration is usually effected in a separate zone to which the catalyst is continuously recycled. Partially regenerated catalyst may be withdrawn from the regeneration zone, cooled and recycled thereto to maintain the desired regeneration temperature. The regenerated catalyst is continuously recharged to the reaction zone where it is contacted with the hydrocarbon vapors.

Having thus described our invention, what we claim is:

1. The process of converting hydrocarbons comprising subjecting said hydrocarbons at conversion temperature to the action of a solid hydrocarbon conversion catalyst prepared from a physical mixture of active silica and calcined magnesia stabilized against deterioration by high temperature with a small amount of an oxide of a metal of the left column of group VI of the periodic system, said magnesia having been calcined and treated with said group VI metal oxide before mixing with said silica.

2. The process of claim 1 wherein the amount of magnesia in the catalyst is about 5 to 50% and the amount of stabilizing metal oxide is about 0.1 to 10%.

3. A catalyst for the conversion of hydrocarbon oils which comprises an intimate mixture of active silica and calcined magnesia stabilized against deterioration by high temperature with a small amount of an oxide of a metal of the left column of group VI of the periodic system, said magnesia having been calcined and treated with said group VI metal oxide before mixing with said silica.

4. The catalyst of claim 3 in which said metal is uranium.

5. The catalyst of claim 3 in which said metal is tungsten.

6. An improved hydrocarbon conversion catalyst prepared by mixing silica hydrogel and calcined magnesia, stabilized against deterioration by high temperature by the presence of a small amount of an oxide of a metal of the left column of group VI of the periodic system, then dried and ignited, said magnesia having been calcined and treated with said group VI metal oxide before mixing with said silica.

7. The catalyst of claim 6 wherein the magnesia is obtained by calcining magnesite at a temperature between about 1000 and 2000° F.

8. The catalyst of claim 6 wherein the amount of magnesia present is about 5 to 50% of the weight of the catalyst.

9. The catalyst of claim 6 wherein the amount of magnesia is about 15 to 30% of the weight of the catalyst.

10. The method of increasing the thermal stability at high temperature of hydrocarbon conversion catalysts composed essentially of active silica intimately mixed with calcined magnesia which comprises incorporating in said magnesia before mixing, a small amount of an oxide of a metal of the left column of group VI of the periodic system.

11. The process of converting heavy hydrocarbon oils into gasoline of high knock rating which comprises subjecting the vapors of said oils at conversion temperature to the action of a solid contact catalyst comprising an intimate mixture of active silica and calcined magnesia, stabilized against deterioration by high temperature by a small amount of an oxide of a metal of the left column of group VI of the periodic system, said magnesia having been calcined and treated with said group VI metal oxide before mixing with said silica.

12. The process of claim 11 wherein said catalyst is prepared by treating magnesia with a solution of a salt of said stabilizing metal, drying and igniting the treated magnesia, then intimately mixing with silica gel and sufficient water to form a paste and drying and igniting the resulting product.

13. In the process of converting hydrocarbons which comprises contacting the hydrocarbons with a conversion catalyst for a period of time until the activity of the catalyst is impaired by the deposition of carbonaceous matter thereon after which the catalyst is regenerated by combustion with oxidizing gas, then used again in the reaction, and the operation is repeated an indefinite number of times, the improvement comprising employing a catalyst in said reaction in which calcined magnesia is intimately associated with active silica and the catalyst mixture is stabilized against loss of activity from heating during regeneration by the addition to said magnesia before associating with said silica, of a small amount of an oxide of a metal of the left column of group VI of the periodic system, then conducting the regeneration at a high temperature at which catalyst activity is rapidly impaired when said group VI metal oxide is absent.

14. The process of claim 13 wherein said group VI metal is uranium.

JAMES C. BAILIE.
MELVIN J. SEE.